(No Model.)
T. L. SMITH.
WEEDING AND ROOT PULLING IMPLEMENT.
No. 531,449. Patented Dec. 25, 1894.
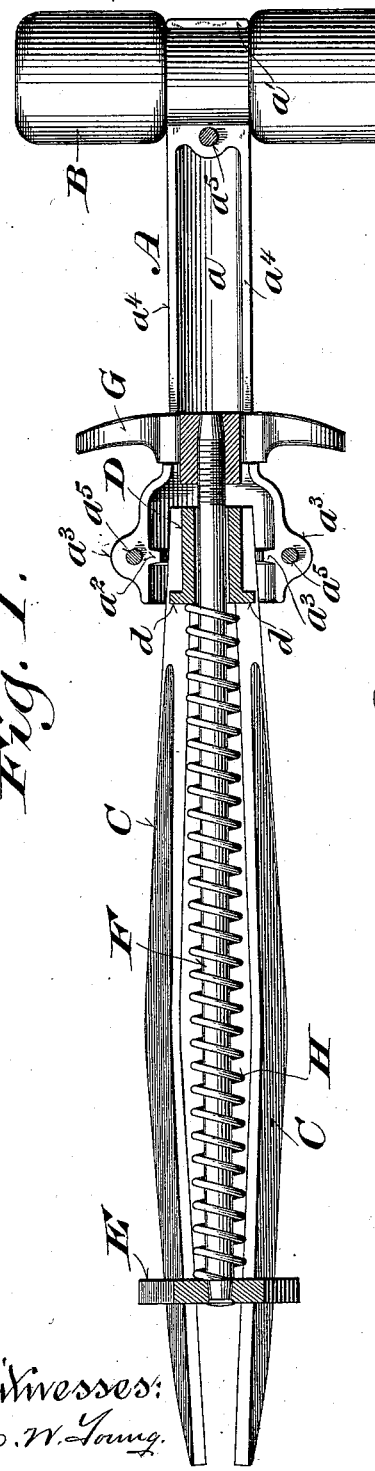
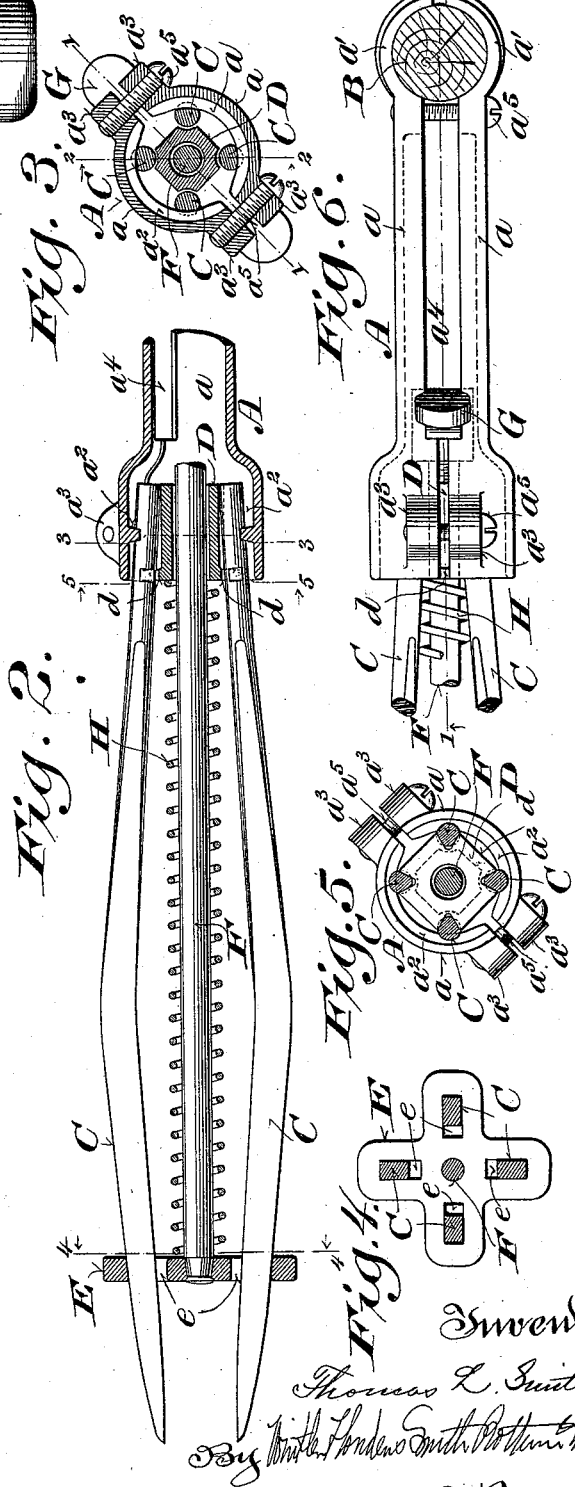
Witnesses:
Geo. W. Young.
Chas. L. Goss.
Inventor:
Thomas L. Smith,
By his Attorneys

UNITED STATES PATENT OFFICE.

THOMAS L. SMITH, OF MILWAUKEE, WISCONSIN.

WEEDING AND ROOT-PULLING IMPLEMENT.

SPECIFICATION forming part of Letters Patent No. 531,449, dated December 25, 1894.

Application filed August 25, 1894. Serial No. 521,314. (No model.)

*To all whom it may concern:*

Be it known that I, THOMAS L. SMITH, of Milwaukee, in the county of Milwaukee and State of Wisconsin, have invented certain new and useful Improvements in Weeding and Root-Pulling Implements; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to facilitate pulling weeds and other roots and to avoid, as far as possible, mutilation and disturbance of the turf in weeding lawns.

It consists essentially of the combination with a suitable shank and handle; of a guide adapted to bear on the surface of the ground and prongs attached to said shank and handle and engaged by said guide so that when they are thrust into the ground around a root they will be forced by said guide into engagement with the root; and of certain novel features in the construction and arrangement of the component parts of the implement, as hereinafter particularly described and pointed out in the claims.

In the accompanying drawings like letters designate the same parts in the several figures.

Figure 1 is a longitudinal section of the implement, embodying my invention, on the line 1 1, Figs. 3 and 6. Fig. 2 is a similar section of the lower portion of the implement on the line 2 2, Fig. 3. Figs. 3, 4 and 5 are cross sections on the lines 3, 3 4, 4 5 5, respectively of Fig. 2; and Fig. 6 is a side elevation of the upper portion of the implement, the handle being shown in section.

A designates a hollow shank, preferably cast in two sections, $a, a,$ which have at their upper ends two opposing semicircular or other suitably shaped jaws, $a' a'$ for embracing and holding the handle, B. They are enlarged at their lower ends and formed on the inside with an inwardly projecting flange or rib, $a^2$, and on the outside with perforated ears, $a^3, a^3$. The handle B may be conveniently turned out of wood as shown, but it may be cast or otherwise formed with shank A which constitutes the body of the implement.

C, C, designate the root-pulling prongs. They are formed or provided with converging portions or guiding surfaces inclined to the axis of the implement for a purpose hereinafter explained, and are preferably pointed or sharpened to facilitate their insertion into the ground.

D is a thimble formed at its lower end with an outwardly projecting flange $d$, which has V-shaped notches formed therein, as shown in Fig. 5. The upper ends of the prongs are notched in opposite sides to fit into said V-shaped notches and in their outer sides to engage with the flange or rib, $a^2$, as shown in Fig. 2, and are securely held thereby in the shank A, and prevented from turning.

E designates a guide adapted to bear upon the surface of the ground and movable lengthwise of the prongs C in engagement with their inclined or guiding surfaces. It is formed on or attached to the lower end of a rod, F, which passes upwardly therefrom between the prongs, through the thimble, D, and is provided at its upper end with a hand-grip or auxiliary handle, G, which projects through longitudinal slots, $a^4$, in the sides of shank, A, as shown in Figs. 1 and 6, in position to be grasped by the fingers of the same hand that holds the handle, B, when the implement is thrust into the ground.

H is a spiral spring coiled around the rod F, and bearing at its lower end against the guide E, and at its upper end against the thimble D. It tends to force the guide downwardly upon the prongs C, as shown in Figs. 1 and 2, and to spread or force them apart and to eject roots and dirt from the implement.

The prongs C, are preferably flattened and openings $e, e,$ of corresponding shape are made in guide E to assist in holding them firmly in their proper relative positions. They are preferably bent as shown, at a point about midway between their ends and converge from that point in both directions toward the axis of the implement.

The parts above-mentioned being assembled as shown in the drawings, are secured and held together, as shown in Figs. 1, 3, 5 and 6, by two screws $a^5, a^5,$ one passing through the sections $a, a,$ of shank A, next to handle B, and one through ears $a^3, a^3,$ on each side thereof, or by rivets, bolts, or other suitable means.

My improved implement operates as follows: The points of the prongs C, being placed around the root of the weed or other plant to be pulled, are thrust by the handle, B, into the ground. The guide, E, bearing upon the surface of the ground in engagement with the outer inclined edges of the prongs, forces them together as they descend through it into the ground, and causes them to grasp the root at a distance below the surface approximately equal to the distance between the handle B, and the hand-grip, G, in its lower position. When the handle, B, is carried down to or near the hand-grip, G, the latter is grasped and held in the same hand, while the implement is withdrawn, the prongs, C, being thus held in engagement with the root which is removed with them from the ground. After the withdrawal of the implement from the ground, the hand-grip, G, is released, and the spring, H, acting on the guide E, forces it downwardly on the prongs, C, which being rigidly held at their upper ends between the rib or flange $a^2$, of shank, A, and the notched flange $d$, of thimble D, tend to spread or spring apart at their lower ends. The root is thus released and automatically ejected from the implement and the prongs are returned to and held in the proper position for thrusting them into the ground to pull another root.

It will be observed that the act of thrusting the implement into the ground automatically forces the prongs together into engagement with an intermediate root without other manipulation and they are held in engagement therewith as the implement is withdrawn by simply grasping the hand-grip G, and holding it with the main handle, B.

I do not wish to be understood as limiting myself to the exact details of construction herein shown and described, inasmuch as various changes may be made therein within the intended spirit and scope of my invention. It is obvious that the implement may be made of different sizes and the prongs C, C, may be specially constructed and arranged to grasp roots of various kinds at any desired distance below the surface of the ground.

I claim—

1. In a weeding and root pulling implement, the combination with a suitable body, of prongs attached thereto and movable at their lowers ends toward and from the axis of the implement, and a guide adapted to bear on the surface of the ground and to automatically force said prongs toward each other when they are thrust into the ground, substantially as and for the purposes set forth.

2. In a weeding and root pulling implement, the combination with a suitable body provided with a handle, of prongs attached thereto and movable at their lower ends toward and from the axis of the implement, a guide adapted to bear on the surface of the ground and to automatically force said prongs toward each other when they are thrust into the ground, and a handle connected with said guide for holding the prongs in engagement with a root when they are withdrawn from the ground, substantially as and for the purposes set forth.

3. In a weeding and root pulling implement, the combination with a suitable body and handle, of prongs attached thereto and having guiding faces inclined to the axis of the implement, a guide movable lengthwise of said prongs in engagement with their inclined faces and adapted to bear on the surface of the ground and automatically force the prongs toward each other when they are thrust into the ground, a handle connected with said guide for holding it in its upper position, and a spring tending to return it to its lower position, substantially as and for the purposes set forth.

4. In a weeding and root pulling implement, the combination of a hollow shank composed of two sections having an inwardly projecting flange, a thimble having an outwardly projecting flange, prongs notched to engage with said flanges and rigidly held between them, said prongs having guiding faces inclined to the axis of the implement and a guide movable lengthwise thereof in engagement with said guiding faces, substantially as and for the purposes set forth.

5. In a weeding and root pulling implement, the combination with a suitable body and handle, of elastic prongs rigidly secured at their upper ends to said body and converging toward their lower ends; a perforated guide-plate loosely engaging the converging portions of said prongs and movable endwise thereon; a rod attached at its lower end to said guide-plate, and provided at its upper end with a handle and a spring tending to force said guide-plate toward the free ends of said prongs, substantially as and for the purposes set forth.

6. In a weeding and root pulling implement the combination of a hollow shank composed of two sections and having a handle at the upper end; an inwardly projecting flange at or near the lower end and longitudinal slots in the sides; a thimble having an outwardly projecting notched flange, prongs notched to engage with said flanges, and clamped between them; said prongs converging toward their lower ends; a rod passing loosely through said thimble and provided at its upper end with a handle, projecting through the slots in said shank; a guide carried by the lower end of said rod in engagement with the converging portions of said prongs; and a spiral spring placed on said rod between said thimble and guide, substantially as and for the purposes set forth.

In testimony that I claim the foregoing as my own I affix my signature in presence of two witnesses.

THOMAS L. SMITH.

Witnesses:
A. F. SMITH,
CHAS. L. GOSS.